United States Patent
Xie et al.

(10) Patent No.: US 10,577,252 B2
(45) Date of Patent: Mar. 3, 2020

(54) SYNTHESIS OF MOLECULAR SIEVE SSZ-109

(71) Applicant: Chevron U.S.A. Inc., San Ramon, CA (US)

(72) Inventors: Dan Xie, Richmond, CA (US); Adeola Florence Ojo, Pleasant Hill, CA (US)

(73) Assignee: Chevron U.S.A., Inc., Sam Ramon, CA (US)

( * ) Notice: Subject to any disclaimer, the term of this patent is extended or adjusted under 35 U.S.C. 154(b) by 0 days.

(21) Appl. No.: 16/395,325

(22) Filed: Apr. 26, 2019

(65) Prior Publication Data

US 2019/0375648 A1    Dec. 12, 2019

Related U.S. Application Data

(60) Provisional application No. 62/681,759, filed on Jun. 7, 2018.

(51) Int. Cl.
| | |
|---|---|
| *C01B 39/48* | (2006.01) |
| *B01J 29/70* | (2006.01) |
| *B01J 29/86* | (2006.01) |
| *C01B 39/12* | (2006.01) |

(52) U.S. Cl.
CPC .............. *C01B 39/48* (2013.01); *B01J 29/70* (2013.01); *B01J 29/86* (2013.01); *C01B 39/12* (2013.01); *C01P 2002/30* (2013.01); *C01P 2002/72* (2013.01); *C01P 2004/03* (2013.01)

(58) Field of Classification Search
CPC .......... C01B 39/12; C01B 39/48; B01J 29/70; B01J 29/86; C01P 2002/30; C01P 2002/70; C01P 2004/03
See application file for complete search history.

(56) References Cited

U.S. PATENT DOCUMENTS

| | | | |
|---|---|---|---|
| 10,214,427 B2 * | 2/2019 | Xie | .............. C01B 37/02 |
| 10,221,074 B2 * | 3/2019 | Xie | .............. B01J 29/061 |
| 2009/0076317 A1 | 3/2009 | Lai et al. | |
| 2018/0312408 A1 | 11/2018 | Xie | |

FOREIGN PATENT DOCUMENTS

| | | |
|---|---|---|
| EP | 1088780 A1 | 4/2001 |
| WO | 2018197982 A1 | 11/2018 |
| WO | 2018229582 A1 | 12/2018 |

OTHER PUBLICATIONS

PCT International Search Report, International Appl. No. PCT/IB2018/053433, dated Jul. 22, 2019.

* cited by examiner

*Primary Examiner* — David M Brunsman
(74) *Attorney, Agent, or Firm* — Terrence M. Flaherty

(57) ABSTRACT

A method is provided for synthesizing a molecular sieve having the framework structure of SSZ-109 using $N^1,N^6$-diisopropyl-$N^1,N^1,N^6,N^6$-tetramethylhexane-1,6-diaminium cations as a structure directing agent.

10 Claims, 2 Drawing Sheets

SYNTHESIS OF MOLECULAR SIEVE SSZ-109

CROSS-REFERENCE TO RELATED APPLICATIONS

This application claims priority to and the benefit of U.S. Provisional Application Ser. No. 62/681,759, filed Jun. 7, 2018.

FIELD

This disclosure relates to the synthesis of molecular sieve SSZ-109.

BACKGROUND

Zeolitic materials are known to have utility as sorbent materials and to have catalytic properties for various types of hydrocarbon conversion reactions. Certain zeolitic materials are ordered, porous crystalline metallosilicates having a definite crystalline structure as determined by X-ray diffraction. Within the zeolitic material there are a large number of smaller cavities which may be interconnected by a number of still smaller channels or pores. These cavities and pores are uniform in size within a specific zeolitic material. Since the dimensions of these pores are such as to accept for sorption molecules of certain dimensions while rejecting those of larger dimensions, these materials have come to be known as "molecular sieves" and are utilized in a variety of ways to take advantage of these properties.

The composition and characterizing X-ray diffraction pattern of molecular sieve SSZ-109 are disclosed in U.S. Patent Appl. Publication No. US2018/0312408, which also describes the preparation of the molecular sieve using a structure directing agent comprising one or more of N,N',N'-tetramethyl-N,N'-diisobutylhexane-1,6-diammonium cations, N,N,N',N'-tetramethyl-N,N'-dineopentylhexane-1,6-diammonium cations, and N,N,N',N'-tetramethyl-N-isobutyl-N'-neopentylhexane-1,6-diammonium cations.

According to the present disclosure, it has now been found that the organic cations described herein can be effective as structure directing agents in the synthesis of SSZ-109.

SUMMARY

In one aspect, there is provided a method of synthesizing a molecular sieve having the structure of SSZ-109, the method comprising: (a) providing a reaction mixture comprising: (1) a source of silicon oxide; (2) a source of an oxide of a trivalent element (X); (3) optionally, a source of a Group 1 or Group 2 metal (M); (4) a structure directing agent (Q) comprising $N^1,N^6$-diisopropyl-$N^1,N^1,N^6,N^6$-tetramethylhexane-1,6-diaminium cations; (5) a source of hydroxide ions; and (6) water; and (b) subjecting the reaction mixture to crystallization conditions sufficient to form crystals of the molecular sieve.

In another aspect, there is provided a molecular sieve having the structure of SSZ-109 and, in its as-synthesized form, comprising $N^1,N^6$-diisopropyl-$N^1,N^1,N^6,N^6$-tetramethylhexane-1,6-diaminium cations in its pores.

The molecular sieve can have, in its as-synthesized and anhydrous form, a chemical composition comprising the following molar relationship:

|  | Broad | Exemplary |
| --- | --- | --- |
| $SiO_2/X_2O_3$ | ≥10 | 20 to 500 |
| $Q/SiO_2$ | >0 to 0.1 | >0 to 0.1 |
| $M/SiO_2$ | 0 to 0.1 | 0 to 0.1 | wherein X is a trivalent element (e.g., one or more of boron, aluminum, gallium, and iron); and Q comprises $N^1,N^6$-diisopropyl-$N^1,N^1,N^6,N^6$-tetramethylhexane-1,6-diaminium cations.

DETAILED DESCRIPTION

Introduction

Figure 1:
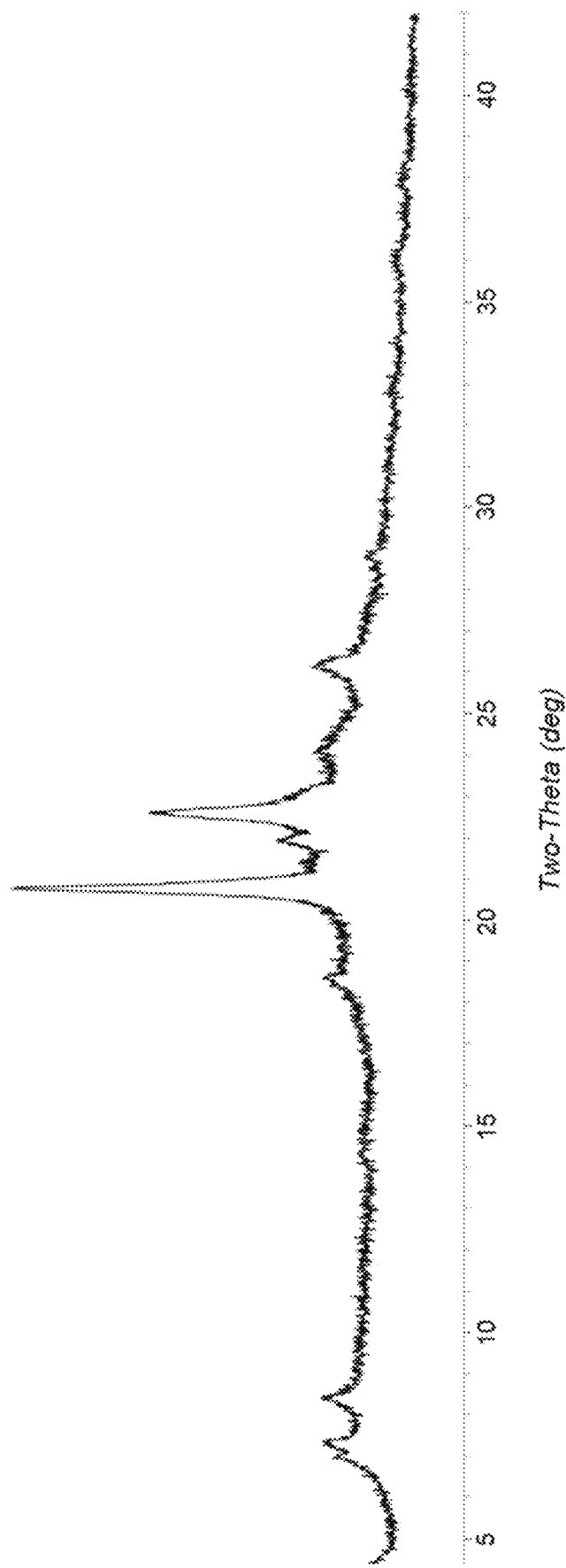
FIG. 1 shows a powder X-ray diffraction (XRD) pattern of the as-synthesized molecular sieve prepared in Example 1.

The term "as-synthesized" is employed herein to refer to a molecular sieve in its form after crystallization, prior to removal of the structure directing agent.

The term "anhydrous" is employed herein to refer to a molecular sieve substantially devoid of both physically adsorbed and chemically adsorbed water.

As used herein, the numbering scheme for the Periodic Table Groups is as disclosed in Chem. Eng. News 1985, 63(5), 26-27.

Reaction Mixture

In general, a molecular sieve having the framework structure of SSZ-109 may be synthesized by: (a) providing a reaction mixture comprising: (1) a source of silicon oxide; (2) a source of an oxide of a trivalent element (X); (3) optionally, a source of a Group 1 or Group 2 metal (M); (4) a structure directing agent (Q) comprising $N^1,N^6$-diisopropyl-$N^1,N^1,N^6,N^6$-tetramethylhexane-1,6-diaminium cations; (5) a source of hydroxide ions; and (6) water; and (b) subjecting the reaction mixture to crystallization conditions sufficient to form crystals of the molecular sieve.

The reaction mixture may have a composition, in terms of molar ratios, within the ranges set forth in Table 1:

TABLE 1

| Reactants | Useful | Exemplary |
| --- | --- | --- |
| $SiO_2/X_2O_3$ | ≥10 | 20 to 500 |
| $M/SiO_2$ | 0 to 0.50 | 0.01 to 0.20 |
| $Q/SiO_2$ | 0.05 to 0.50 | 0.10 to 0.25 |
| $OH/SiO_2$ | 0.01 to 0.60 | 0.20 to 0.40 |
| $H_2O/SiO_2$ | 10 to 80 | 15 to 50 | wherein compositional variables X, M and Q are as described herein above.

Suitable sources of silicon oxide include fumed silica, colloidal silica, precipitated silica, alkali metal silicates and tetraalkyl orthosilicates.

Suitable sources of trivalent element X depend on the element X that is selected (e.g., boron, aluminum, gallium, and iron). In embodiments where X comprises or is boron, suitable sources of boron include boric acid, sodium tetraborate and potassium tetraborate. Combined sources of silicon and boron can additionally or alternatively be used and can include borosilicate zeolites (e.g., borosilicate beta zeolite). In embodiments where X comprises or is aluminum, suitable sources of aluminum include hydrated alumina, aluminum hydroxide, alkali metal aluminates, aluminum alkoxides, and water-soluble aluminum salts (e.g., aluminum nitrate). Combined sources of silicon and aluminum can additionally or alternatively be used and can include aluminosilicate zeolites (e.g., zeolite Y) and clays or treated clays (e.g., meta kaolin).

Examples of suitable Group 1 or Group 2 metals (M) include sodium, potassium and calcium. The metal is generally present in the reaction mixture as the hydroxide.

The structure directing agent (Q) comprises $N^1,N^6$-diisopropyl-$N^1,N^1,N^6,N^6$-tetramethylhexane-1,6-diaminium cations, represented by the following structure (1):

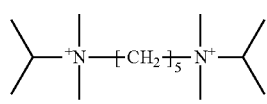

(1)

Suitable sources of Q are the hydroxides and/or other salts of the diquaternary ammonium compound.

The reaction mixture may also contain seeds of a crystalline molecular sieve material, such as SSZ-109 from a previous synthesis, desirably in an amount of from 0.01 to 15,000 ppm by weight (e.g., from 100 to 10,000 ppm by weight) of the reaction mixture. Seeding can be advantageous in decreasing the amount of time necessary for complete crystallization to occur. In addition, seeding can lead to an increased purity of the product obtained by promoting the nucleation and/or formation of SSZ-109 over any undesired phases.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

Crystallization of the molecular sieve from the above reaction mixture can be carried out under either static, tumbled or stirred conditions in a suitable reactor vessel, such as for example polypropylene jars or Teflon-lined or stainless-steel autoclaves, at a temperature of from 125° C. to 200° C. for a time sufficient for crystallization to occur at the temperature used, e.g., from about 50 to 500 hours. Crystallization is usually carried out in an autoclave so that the reaction mixture is subject to autogenous pressure.

Once the molecular sieve crystals have formed, the solid product is separated from the reaction mixture by standard mechanical separation techniques such as centrifugation or filtration. The crystals are water-washed and then dried to obtain the as-synthesized molecular sieve crystals. The drying step is typically performed at a temperature of less than 200° C.

As a result of the crystallization process, the recovered crystalline molecular sieve product contains within its pores at least a portion of the structure directing agent used in the synthesis.

The molecular sieve described herein may be subjected to treatment to remove part or all of the structure directing agent (Q) used in its synthesis. This can be conveniently effected by thermal treatment in which the as-synthesized material is heated at a temperature of at least about 370° C. for at least 1 minute and generally not longer than 20 hours. The thermal treatment can be performed at a temperature up to 925° C. While sub-atmospheric pressure can be employed for the thermal treatment, atmospheric pressure is desired for reasons of convenience. Additionally or alternatively, the structure directing agent can be removed by treatment with ozone (see, e.g., A. N. Parikh et al., *Micropor. Mesopor. Mater.* 2004, 76, 17-22).

To the extent desired, any Group 1 or 2 metal cations in the as-synthesized molecular sieve can be replaced in accordance with techniques well known in the art by ion exchange with other cations. Preferred replacing cations include metal ions (e.g., rare earth metals and metals of Groups 2 to 15 of the Periodic Table), hydrogen ions, hydrogen precursor ions (e.g., ammonium ions), and combinations thereof.

SSZ-109 can be formulated into a catalyst composition by combination with other materials, such as binders and/or matrix materials, which provide additional hardness or catalytic activity to the finished catalyst. When blended with such components, the relative proportions of SSZ-109 and matrix may vary widely with the SSZ-109 content ranging from 1 to 90 wt. % (e.g., from 2 to 80 wt. %) of the total catalyst.

Characterization of the Molecular Sieve

In its as-synthesized and anhydrous form, the present molecular sieve can have a chemical composition comprising the molar relationship set forth in Table 2:

TABLE 2

|  | Broad | Exemplary |
|---|---|---|
| $SiO_2/X_2O_3$ | ≥10 | 20 to 500 |
| $Q/SiO_2$ | >0 to 0.1 | >0 to 0.1 |
| $M/SiO_2$ | 0 to 0.1 | 0 to 0.1 | wherein X, Q and M are as described herein above.

In some embodiments, the present molecular sieve may be an aluminosilicate or a borosilicate.

It should be noted that the as-synthesized form of the present molecular sieve may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

As taught by U.S. Patent Application Publication No. 2018/0312408, molecular sieve SSZ-109 has an X-ray diffraction pattern which, in its as-synthesized form, includes at least the peaks set forth in Table 3 below and which, in its calcined form, includes at least the peaks set forth in Table 4.

TABLE 3

Characteristic Peaks for As-Synthesized SSZ-109

| 2-Theta[a] | d-Spacing, nm | Relative Intensity[b] | Peak Broadening[c] |
|---|---|---|---|
| 7.29 | 1.212 | W | B |
| 8.36 | 1.056 | W | Sh |
| 14.71 | 0.602 | W | B |
| 18.45 | 0.480 | W | B |
| 20.74 | 0.428 | VS | Sh |
| 21.82 | 0.407 | W | Sh |

TABLE 3-continued

Characteristic Peaks for As-Synthesized SSZ-109

| 2-Theta[a] | d-Spacing, nm | Relative Intensity[b] | Peak Broadening[c] |
|---|---|---|---|
| 22.53 | 0.394 | VS | Sh |
| 23.92 | 0.372 | W | B |
| 26.17 | 0.340 | M | B |
| 28.71 | 0.311 | W | Sh |

[a]±0.30 degrees
[b]The powder X-ray diffraction patterns provided are based on a relative intensity scale in which the strongest line in the X-ray diffraction pattern is assigned a value of 100: W = weak (>0 to ≤20); M = medium (>20 to ≤40); S = strong (>40 to ≤60); VS = very strong (>60 to ≤100).
[c]Peak Broadening is characterized by the Full-Width at Half Maximum (FWHM) of the XRD peak. Based on the FWHM values, the peaks are classified as: Sh = sharp (≤1.5* smallest FWHM); B = broad (>1.5*smallest FWHM). Peak broadening may be contributed from structural disorder and/or overlapping of reflections having close d-spacing values.

TABLE 4

Characteristic Peaks for Calcined SSZ-109

| 2-Theta[a] | d-Spacing, nm | Relative Intensity[b] | Peak Broadening[c] |
|---|---|---|---|
| 7.21 | 1.225 | M | B |
| 8.43 | 1.048 | W | Sh |
| 14.54 | 0.609 | W | B |
| 18.62 | 0.476 | W | B |
| 20.80 | 0.427 | VS | Sh |
| 21.90 | 0.405 | W | Sh |
| 22.74 | 0.391 | M | Sh |
| 24.02 | 0.370 | W | B |
| 26.34 | 0.338 | M | B |
| 29.01 | 0.308 | W | B |

[a]±0.30 degrees
[b]The powder X-ray diffraction patterns provided are based on a relative intensity scale in which the strongest line in the X-ray diffraction pattern is assigned a value of 100: W = weak (>0 to ≤20); M = medium (>20 to ≤40); S = strong (>40 to ≤ 60); VS = very strong (>60 to ≤100).
[c]Peak Broadening is characterized by the Full-Width at Half Maximum (FWHM) of the XRD peak. Based on the FWHM values, the peaks are classified as: Sh = sharp (≤1.5* smallest FWHM); B = broad (>1.5*smallest FWHM). Peak broadening may be contributed from structural disorder and/or overlapping of reflections having close d-spacing values.

The powder X-ray diffraction patterns presented herein were collected by standard techniques. The radiation was CuKα radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

EXAMPLES

The following illustrative examples are intended to be non-limiting.

Example 1

2.88 g of deionized water, 0.06 g of a 50% NaOH solution, 0.83 g of a 14.21% $N^1,N^6$-diisopropyl-$N^1,N^6,N^6$-tetramethylhexane-1,6-diaminium hydroxide solution, and 0.50 g of CBV780 Y-zeolite (Zeolyst International; $SiO_2/Al_2O_3$ molar ratio=80) were mixed together in a Teflon liner. The resulting gel was stirred until it became homogeneous. The liner was then capped and placed within a Parr Steel autoclave reactor. The autoclave was then put in an oven heated at 160° C. for 6 days under static conditions. The solid products were recovered from the cooled reactor by centrifugation, washed with deionized water and dried at 95° C.

Figure 2:
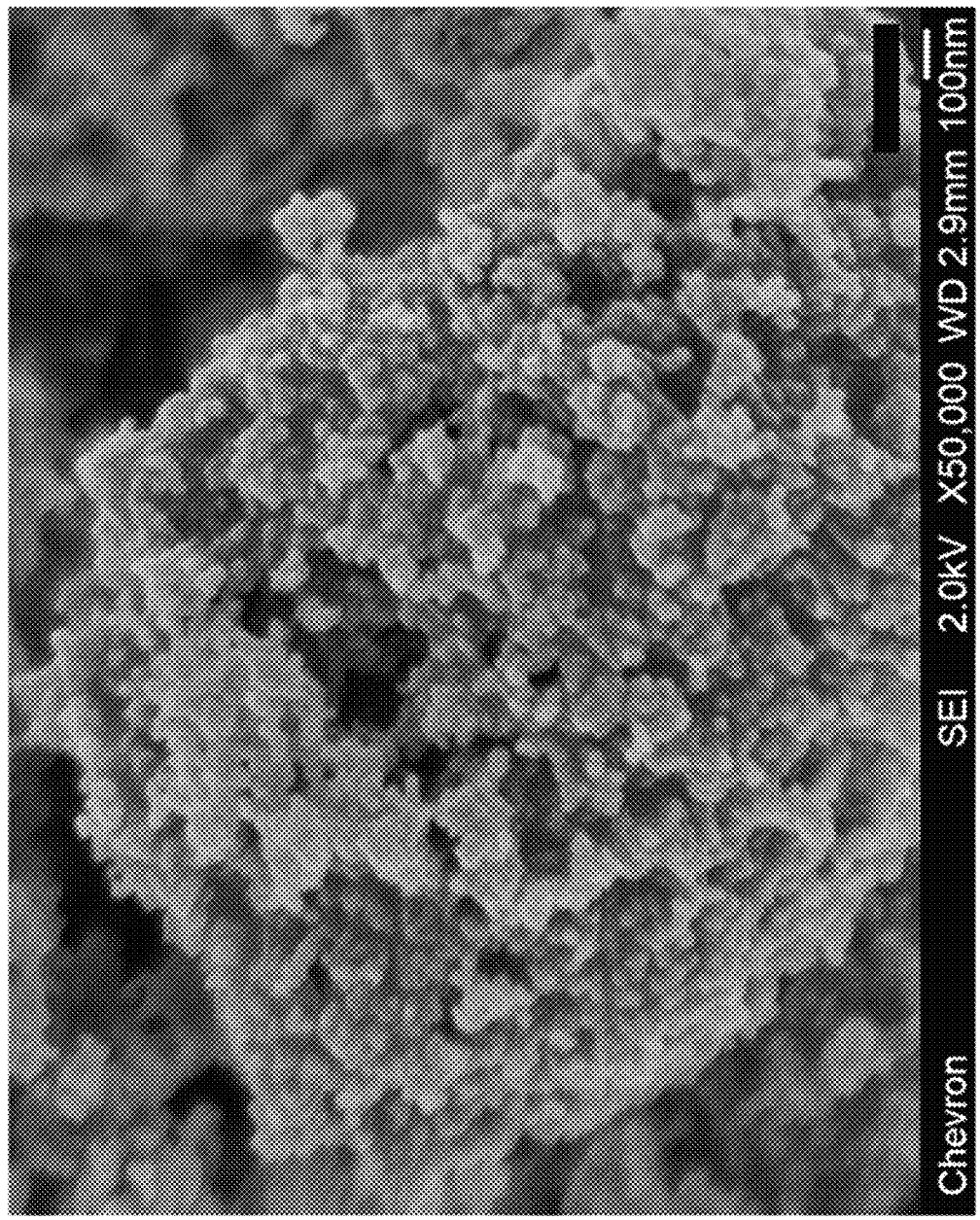
FIG. 2 shows a Scanning Electron Micrograph (SEM) image of the as-synthesized molecular sieve prepared in Example 1.

The resulting product was analyzed by powder XRD and SEM. The powder XRD pattern of the product is shown FIG. 1 and is consistent with the product being SSZ-109. A SEM image of the product is shown in FIG. 2 and indicates a uniform field of crystals.

The product had a $SiO_2/Al_2O_3$ molar ratio of 90.4, as determined by Inductively Coupled Plasma (ICP) elemental analysis.

Example 2

6.87 g of deionized water, 0.24 g of a 45% KOH solution, 1.99 g of a 14.21% $N^1,N^6$-diisopropyl-$N^1,N^1,N^6,N^6$-tetramethylhexane-1,6-diaminium hydroxide solution, and 1.20 g of CBV780 Y-zeolite (Zeolyst International; $SiO_2/Al_2O_3$ molar ratio=80) were mixed together in a Teflon liner. The resulting gel was stirred until it became homogeneous. The liner was then capped and placed within a Parr Steel autoclave reactor. The autoclave was then put in an oven heated at 160° C. for 6 days under static conditions. The solid products were recovered from the cooled reactor by centrifugation, washed with deionized water and dried at 95° C.

The resulting product was analyzed by powder XRD and SEM and shown to be SSZ-109.

The product had a $SiO_2/Al_2O_3$ molar ratio of 86.9, as determined by ICP elemental analysis.

Example 3

5.16 g of deionized water, 0.09 g of a 45% KOH solution, 2.47 g of a 14.21% $N^1,N^6$-diisopropyl-$N^1,N^1,N^6,N^6$-tetramethylhexane-1,6-diaminium hydroxide solution, 0.03 g of 50% Reheis F-2000 aluminum hydroxide dried gel and 3.00 g of LUDOX® AS-30 colloidal silica were mixed together in a Teflon liner. The gel was stirred until it became homogeneous. The liner was then capped and placed within a Parr Steel autoclave reactor. The autoclave was then put in an oven heated at 160° C. for 10 days with tumbling at 43 rpm. The solid products were recovered from the cooled reactor by centrifugation, washed with deionized water and dried at 95° C.

The resulting product was analyzed by powder XRD and SEM and shown to be SSZ-109.

The product had a $SiO_2/Al_2O_3$ molar ratio of 82.4, as determined by ICP elemental analysis.

Example 4

5.22 g of deionized water, 2.47 g of a 14.21% $N^1,N^6$-diisopropyl-$N^1,N^1,N^6,N^6$-tetramethylhexane-1,6-diaminium hydroxide solution, 0.02 g of 50% Reheis F-2000 aluminum hydroxide dried gel and 3.00 g of LUDOX© AS-30 colloidal silica were mixed together in a Teflon liner. The resulting gel was stirred until it became homogeneous. The liner was then capped and placed within a Parr Steel autoclave reactor. The autoclave was then put in an oven heated at 160° C. for 10 days with tumbling at 43 rpm. The solid products were recovered from the cooled reactor by centrifugation, washed with deionized water and dried at 95° C.

The resulting product was analyzed by powder XRD and SEM and shown to be SSZ-109.

The product had a $SiO_2/Al_2O_3$ mole ratio of 152.9, as determined by ICP elemental analysis.

Example 5

8.61 g of deionized water, 0.16 g of a 45% KOH solution, 4.11 g of a 14.21% $N^1,N^6$-diisopropyl-$N^1,N^1,N^6,N^6$-tetramethylhexane-1,6-diaminium hydroxide solution, 0.03 g of 50% Reheis F-2000 aluminum hydroxide dried gel and 5.00 g of LUDOX© AS-30 colloidal silica were mixed together in a Teflon liner. The gel was stirred until it became homogeneous. The liner was then capped and placed within a Parr Steel autoclave reactor. The autoclave was then put in an oven heated at 160° C. for 10 days with tumbling at 43 rpm. The solid products were recovered from the cooled reactor by centrifugation, washed with deionized water and dried at 95° C.

The resulting product was analyzed by powder XRD and SEM and shown to be SSZ-109.

The product had a $SiO_2/Al_2O_3$ molar ratio of 230.6, as determined by ICP elemental analysis.

Example 6

5.17 g of deionized water, 0.09 g of a 45% KOH solution, 2.47 g of a 14.21% $N^1,N^6$-diisopropyl-$N^1,N^1,N^6,N^6$-tetramethylhexane-1,6-diaminium hydroxide solution, 0.01 g of 50% Reheis F-2000 aluminum hydroxide dried gel and 3.00 g of LUDOX© AS-30 colloidal silica were mixed together in a Teflon liner. The gel was stirred until it became homogeneous. The liner was then capped and placed within a Parr Steel autoclave reactor. The autoclave was then put in an oven heated at 160° C. for 10 days with tumbling at 43 rpm. The solid products were recovered from the cooled reactor by centrifugation, washed with deionized water and dried at 95° C.

The resulting product was analyzed by powder XRD and SEM and shown to be SSZ-109.

The product had a $SiO_2/Al_2O_3$ molar ratio of 498.9, as determined by ICP elemental analysis.

Example 7

4.71 g of deionized water, 0.04 g of a 50% NaOH solution, 1.59 g of a 14.21% $N^1,N^6$-diisopropyl-$N^1,N^1,N^6,N^6$-tetramethylhexane-1,6-diaminium hydroxide solution and 0.60 g of boron Beta zeolite ($SiO_2/B_2O_3$ molar ratio~100) were mixed together in a Teflon liner. The gel was stirred until it became homogeneous. The liner was then capped and placed within a Parr Steel autoclave reactor. The autoclave was then put in an oven heated at 150° C. for 8 days under static conditions. The solid products were recovered from the cooled reactor by centrifugation, washed with deionized water and dried at 95° C.

The resulting product was identified by powder XRD and SEM as SSZ-109.

The product had a $SiO_2/B_2O_3$ molar ratio of 140.2, as determined by ICP elemental analysis.

Example 8

7.82 g of deionized water, 0.10 g of a 45% KOH solution, 2.65 g of a 14.21% $N^1,N^6$-diisopropyl-$N^1,N^1,N^6,N^6$-tetramethylhexane-1,6-diaminium hydroxide solution and 1.00 g of boron Beta zeolite ($SiO_2/B_2O_3$ molar ratio~100) were mixed together in a Teflon liner. The gel was stirred until it became homogeneous. The liner was then capped and placed within a Parr Steel autoclave reactor. The autoclave was then put in an oven heated at 150° C. for 8 days under static conditions. The solid products were recovered from the cooled reactor by centrifugation, washed with deionized water and dried at 95° C.

The resulting product was identified by powder XRD and SEM as SSZ-109.

The product had a $SiO_2/B_2O_3$ molar ratio of 145.6, as determined by ICP elemental analysis.

Example 9

The as-synthesized SSZ-109 product from Example 1 was calcined inside a muffle furnace under a flow of mixed nitrogen and air heated to 540° C. at a rate of 1° C./minute and held at 540° C. for 5 hours, cooled and then analyzed by powder XRD. The powder XRD data indicated that the material remains stable after calcination to remove the organic matter.

Example 10

Micropore Volume Analysis

The calcined material of Example 9 had a micropore volume of 0.08 $cm^3/g$ based on argon adsorption isotherm at 87.50 K (−186° C.) recorded on ASAP 2010 equipment from Micromeritics. The sample is first degassed at 400° C. for 16 hours prior to argon adsorption. The low-pressure dose is 2.00 $cm^3/g$ (STP). A maximum of one hour equilibration time per dose is used and the total run time is 37 hours. The argon adsorption isotherm is analyzed using the density function theory (DFT) formalism and parameters developed for activated carbon slits by J. P. Olivier (*J. Porous Mater.* 1995, 2, 9-17) using the Saito Foley adaptation of the Horvarth-Kawazoe formalism (*Micropor. Mater.* 1995, 3, 531-542) and the conventional t-plot method (*J. Catal.* 1965, 4, 319-323).

Example 11

Ammonium Ion Exchange

An amount of ammonium nitrate equal to the mass of the sample (from Example 9) to be exchanged was fully dissolved in an amount of deionized water ten times the mass of the sample. The sample was then added to the ammonium nitrate solution and the suspension was sealed in a flask and heated in an oven at 95° C. overnight. The flask was removed from the oven, and the sample was recovered immediately by filtration. This ammonium exchange procedure was repeated on the recovered sample, washed with copious amount of deionized water to a conductivity of less than 50 μS/cm and finally dried in an oven at 95° C. for three hours.

Example 12

Hexadecane Conversion

Palladium ion-exchange was carried out on the ammonium-exchanged sample from Example 11 using tetraamminepalladium (II) nitrate (0.5 wt. % Pd). After ion-exchange, the sample was dried at 95° C. and then calcined in air at 482° C. for 3 hours to convert the tetraamminepalladium (II) nitrate to palladium oxide.

0.5 g of each of the palladium exchanged sample was loaded in the center of a 23 inch-long by 0.25 inch outside diameter stainless steel reactor tube with alundum loaded upstream of the catalyst for pre-heating the feed (total pressure of 1200 psig; down-flow hydrogen rate of 160 mL/min, when measured at 1 atmosphere pressure and 25° C.; down-flow liquid feed rate of 1 mL/hour). The sample was first reduced in flowing hydrogen at about 315° C. for 1 hour. Products were analyzed by on-line capillary gas chromatography (GC) once every thirty minutes. Raw data from the GC was collected by an automated data collection/processing system and hydrocarbon conversions were calculated from the raw data.

The catalyst was tested at about 450° F. initially to determine the temperature range for the next set of measurements. The overall temperature range will provide a wide range of hexadecane conversion with the maximum conversion just below and greater than 96%. At least five on-line GC injections were collected at each temperature. Conversion was defined as the amount of hexadecane reacted to produce other products (including iso-$C_{16}$ isomers). Yields were expressed as weight percent of products other than n-$C_{16}$ and included iso-Cm as a yield product. The results are included in Table 5.

TABLE 5

| | |
|---|---|
| Isomerization Selectivity at 96% n-$C_{16}$ Conversion, % | 81 |
| Temperature, ° F. | 539 |
| $C_{4-}$ Cracking, % | 1.8 |

Good catalytic performance is dependent on the synergy between isomerization selectivity and temperature at 96% conversion, whilst minimizing undesirable catalytic cracking. This catalyst demonstrated desirable isomerization selectivity at 96% conversion. The catalyst also showed highly desirable temperature at 96% conversion whilst still maintaining very good isomerization selectivity. Also, undesirable catalytic cracking with concomitant high gas make was low reflected in Table 5 by an acceptable level of $C_{4-}$ cracking.

The invention claimed is:

1. A method of synthesizing a molecular sieve having the structure of SSZ-109, the method comprising:
   (a) providing a reaction mixture comprising:
      (1) a source of silicon oxide;
      (2) a source of an oxide of a trivalent element (X);
      (3) optionally, a source of a Group 1 or Group 2 metal (M);
      (4) a structure directing agent (Q) comprising $N^1,N^6$-diisopropyl-$N^1,N^1,N^6,N^6$-tetramethylhexane-1,6-diaminium cations;
      (5) a source of hydroxide ions; and
      (6) water; and
   (b) subjecting the reaction mixture to crystallization conditions sufficient to form crystals of the molecular sieve.

2. The method of claim 1, wherein the reaction mixture has a composition, in terms of molar ratios, as follows:

| | |
|---|---|
| $SiO_2/X_2O_3$ | ≥10 |
| $M/SiO_2$ | 0 to 0.50 |
| $Q/SiO_2$ | 0.05 to 0.50 |
| $OH/SiO_2$ | 0.01 to 0.60 |
| $H_2O/SiO_2$ | 5 to 60. |

3. The method of claim 1, wherein the reaction mixture has a composition, in terms of molar ratios, as follows:

| | |
|---|---|
| $SiO_2/X_2O_3$ | 20 to 500 |
| $M/SiO_2$ | 0.01 to 0.20 |
| $Q/SiO_2$ | 0.10 to 0.25 |
| $OH/SiO_2$ | 0.20 to 0.40 |
| $H_2O/SiO_2$ | 20 to 40. |

4. The method of claim 1, wherein the trivalent element X comprises one or more of boron and aluminum.

5. The method of claim 1, wherein the crystallization conditions include a temperature of from 125° C. to 200° C.

6. A molecular sieve having the structure of SSZ-109 and, in its as-synthesized form, comprising $N^1,N^6$-diisopropyl-$N^1,N^1,N^6,N^6$-tetramethylhexane-1,6-diaminium cations in its pores.

7. The molecular sieve of claim 6 and having a molar ratio of $SiO_2/X_2O_3$ of at least 10, wherein X is a trivalent element.

8. The molecular sieve of claim 7, wherein the molar ratio of $SiO_2/X_2O_3$ is in a range of from 20 to 500.

9. The molecular sieve of claim 7, wherein the trivalent element X comprises one or more of boron and aluminum.

10. The molecular sieve of claim 5, and having, in its as-synthesized form, an X-ray diffraction including the following peaks:

| 2-Theta[a] | d-Spacing, nm | Relative Intensity[b] | Peak Broadening[c] |
|---|---|---|---|
| 7.29 | 1.212 | W | B |
| 8.36 | 1.056 | W | Sh |
| 14.71 | 0.602 | W | B |
| 18.45 | 0.480 | W | B |
| 20.74 | 0.428 | VS | Sh |
| 21.82 | 0.407 | W | Sh |
| 22.53 | 0.394 | VS | Sh |
| 23.92 | 0.372 | W | B |
| 26.17 | 0.340 | M | B |
| 28.71 | 0.311 | W | Sh. |

* * * * *